United States Patent [19]

Andrä et al.

[11] 4,410,011

[45] Oct. 18, 1983

[54] TUBULAR CASING WITH GLUED SEAM AND ITS MANUFACTURE AND USE FOR CURVED OR RING-SHAPED SAUSAGES

[75] Inventors: Klaus Andrä, Zornheim; Elfriede Hutschenreuter, Bad Schwalbach; Herbert Porrmann, Niedernhausen, all of Fed. Rep. of Germany

[73] Assignee: Hoechst Aktiengesellschaft, Frankfurt am Main, Fed. Rep. of Germany

[21] Appl. No.: 250,886

[22] Filed: Apr. 3, 1981

[30] Foreign Application Priority Data

Oct. 25, 1980 [DE] Fed. Rep. of Germany ....... 3040279

[51] Int. Cl.$^3$ .................... A22C 13/00; F16L 11/00
[52] U.S. Cl. .................... 138/118.1; 138/154; 138/156; 138/170; 174/DIG. 8; 428/36; 426/105; 426/135; 426/140; 426/412; 426/413; 426/414; 426/513
[58] Field of Search .................... 428/36; 138/118.1; 426/105, 135, 140, 412, 413, 414, 513; 174/DIG. 8

[56] References Cited

U.S. PATENT DOCUMENTS

| | | |
|---|---|---|
| 2,000,835 | 5/1935 | Goldberger . |
| 2,136,566 | 11/1938 | Schnecko et al. . |
| 2,148,884 | 2/1939 | Walter . |
| 2,181,887 | 12/1939 | Goodman . |
| 2,210,436 | 8/1940 | Weingard et al. ............... 138/118.1 |
| 2,226,442 | 12/1940 | Rumsey, Jr. . |
| 2,461,975 | 2/1949 | Fuller . |
| 2,573,956 | 11/1951 | Daniel et al. . |
| 2,607,696 | 8/1952 | Kunz . |
| 2,608,488 | 8/1952 | Rumsey, Jr. .......................... 99/176 |
| 2,653,432 | 9/1953 | Wright et al. . |
| 2,685,769 | 8/1954 | Conti . |
| 2,685,770 | 8/1954 | Conti . |
| 2,686,725 | 8/1954 | Cornwell . |
| 2,748,027 | 5/1956 | Meier . |
| 2,757,495 | 8/1956 | Reichel . |
| 2,767,435 | 10/1956 | Alles . |
| 2,773,773 | 12/1956 | Harder et al. . |
| 2,819,488 | 1/1958 | Gimbel . |
| 2,857,283 | 10/1958 | Firth et al. ............................ 99/176 |
| 2,925,621 | 2/1960 | Parth . |
| 2,961,323 | 11/1960 | Underwood et al. . |
| 2,961,340 | 11/1960 | Meier . |
| 2,999,788 | 9/1961 | Morgan . |
| 3,108,017 | 10/1963 | Messwarb et al. . |
| 3,144,425 | 8/1964 | Koch et al. . |
| 3,378,379 | 4/1968 | Shiner et al. . |
| 3,545,161 | 12/1970 | Hoshino et al. . |
| 3,546,209 | 12/1970 | Lipps, Jr. . |
| 3,594,857 | 7/1971 | Michl . |
| 3,619,854 | 11/1971 | Ilgen et al. . |
| 3,679,435 | 7/1972 | Klenk et al. . |
| 3,766,603 | 10/1973 | Urbutis et al. . |
| 3,826,676 | 7/1974 | Heling et al. . |
| 3,852,224 | 12/1974 | Bridgeford . |
| 3,884,270 | 5/1975 | Rasmussen et al. . |
| 3,988,804 | 11/1976 | Regner et al. ................... 138/118.1 |
| 4,185,358 | 1/1980 | Regner et al. ................... 138/118.1 |
| 4,192,904 | 3/1980 | Gerigk et al. . |
| 4,233,341 | 11/1980 | Hammer et al. . |
| 4,283,426 | 8/1981 | Schenk et al. . |
| 4,356,199 | 10/1982 | Hammer et al. ................... 426/105 |
| 4,356,200 | 10/1982 | Hammer et al. ................... 426/105 |

FOREIGN PATENT DOCUMENTS

| | | |
|---|---|---|
| 14346 | 8/1980 | European Pat. Off. . |
| 14353 | 8/1980 | European Pat. Off. . |
| 886863 | 8/1953 | Fed. Rep. of Germany . |
| 1908851 | 1/1970 | Fed. Rep. of Germany . |
| 2832926 | 2/1980 | Fed. Rep. of Germany . |
| 1385394 | 12/1969 | France . |
| 2102508 | 3/1972 | France . |
| 2336884 | 7/1977 | France . |
| 784920 | 10/1957 | United Kingdom . |
| 865727 | 4/1961 | United Kingdom . |
| 908205 | 10/1962 | United Kingdom . |
| 1240560 | 7/1971 | United Kingdom . |

*Primary Examiner*—William R. Dixon, Jr.
*Attorney, Agent, or Firm*—Schwartz, Jeffery, Schwaab, Mack, Blumenthal & Koch

[57] ABSTRACT

A tubular casing for foodstuffs, in particular sausages, comprising a web (4) which is curved along its longitudinal axis and having its longitudinal edge regions (1, 2) bonded by a glued seam. The edge regions (1,2) meet or overlap and are bonded with a strip of film (6). The strip of film (6) comprises a material which is capable of shrinking in the direction of its longitudinal axis at a temperature between about 60° to 100° C. A pressure-sensitive adhesive is used for the bonding. The tubular casing carries an adhesion-promoting layer (5) on the surface adjacent to the adhesive layer (3). Heating the filled casing gives it a curved form.

18 Claims, 10 Drawing Figures

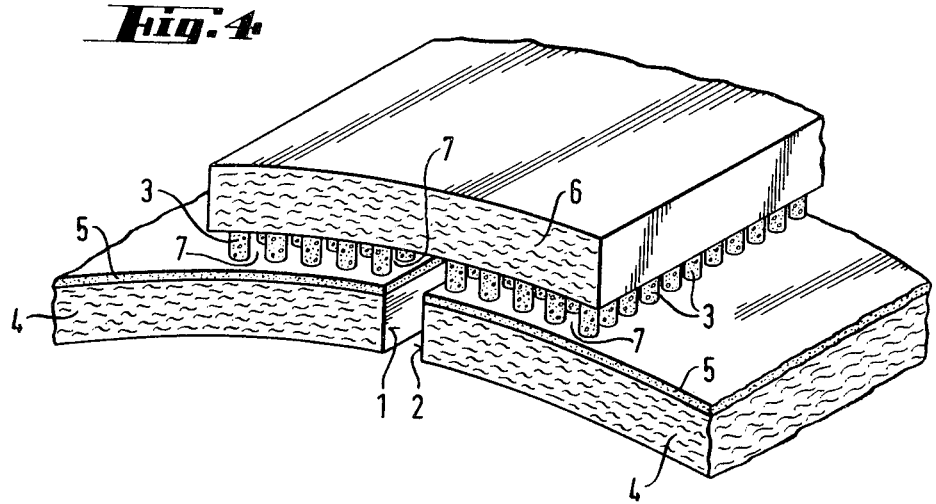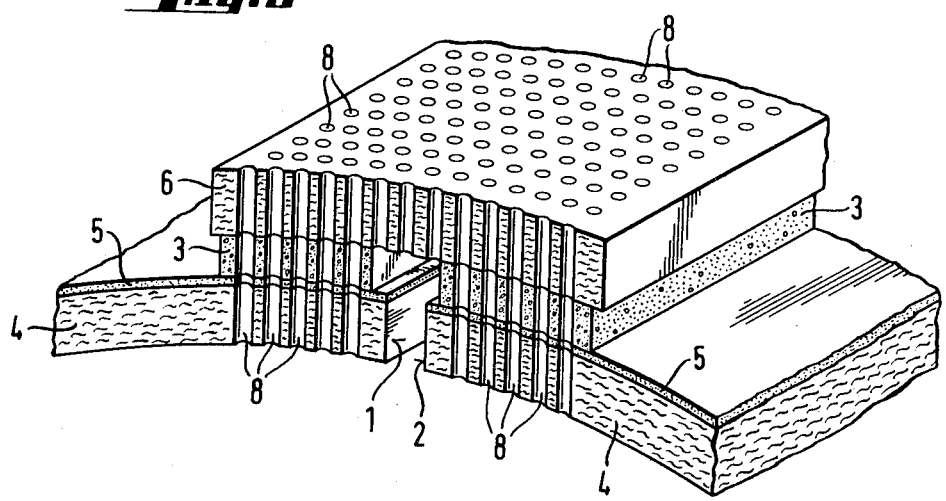

TUBULAR CASING WITH GLUED SEAM AND ITS MANUFACTURE AND USE FOR CURVED OR RING-SHAPED SAUSAGES

BACKGROUND OF THE INVENTION

The present invention relates to a tubular casing, to a process for its manufacture and to its use.

Tubular casings made from a web, for example, of regenerated cellulose, which are manufactured by folding the web along its longitudinal axis and glueing the overlapping edge zones running along the longitudinal axis are well known. See, e.g., U.S. Pat. Nos. 2,148,884, 2,226,442, 2,685,769, 2,685,770 and 2,757,495. The glueing operations hitherto described, however, comprise either the use of solvents by means of which the surface of the web is partly dissolved and is tackified, whereupon an "adhesive" is produced in situ on the surface of the web, or the use of webs which are coated with a thermoplastic resin or consist of a thermoplastic material which can be sealed when heat and pressure are applied. See, e.g., U.S. Pat. No. 2,773,773. Acrylates which can be tackified by application of heat or by means of a solvent are also mentioned as examples of suitable resins in U.S. Pat. No. 2,653,432. Furthermore, it has also been proposed heretofore to use an acid solution of a water-soluble, partially polymerized thermosetting resin as the adhesive agent, with polymerization of the resin being accelerated by the presence of an acid (pH 4.5–5.5) in the aqueous solution. In U.S. Pat. No. 2,607,696, as examples of such resins, there are mentioned aminoplast resins, such as urea/formaldehyde or melamine/formaldehyde resins, ketone/formaldehyde resins and phenolic resins which can be hardened at 180° to 220° C. and thereby glue the overlapping edge regions which are pressed together. U.S. Pat. No. 2,686,725 describes a tubular casing of the foregoing type in which the thermosetting resin, for example, a melamine/formaldehyde resin, is applied, in acid solution to the still moist fiberfree cellulose gel which has not yet been dried, and a heat-sealing layer of polyethylene resin in the form of a tape or as a powder is melted onto the subsequently hardened resin. In order to bond the overlapping edge regions of the cellulose hydrate web, the polyethylene is melted by the application of pressure and elevated temperature, whereupon the overlapping edges are heat-sealed to one another.

U.S. Pat. No. 2,653,432 similarly describes a process for bonding the overlapping edges with a strip of thermoplastic material which becomes tacky when heated.

In contrast, the sausage casings of German Offenlegungsschrift No. 1,908,851 consist of a film of plastic, and the longitudinal seam is produced by heat-sealing the overlapping edges. A tear-tape, which can comprise a polyester carrier film with an adhesive coating, is sealed onto the overlapping region. Application of the tear-tape to the outer side of the tubular casing is also known according to U.S. Pat. No. 3,545,161.

Insofar as these tubular casings actually consist of naturally occurring polymers, they can all be manufactured only in a relatively troublesome manner, that is to say, at high temperatures, with long residence times until the adhesive has set and with the aid of acids or organic solvents which can be removed from the tubular casing only by difficult and very expensive measures. Furthermore, they are not sufficiently gas-and smoke permeable in the glueing region. For these reasons, tubular casings of naturally occurring polymers, for example, based on cellulose, have for many years been predominantly manufactured without a seam, although, because of the relatively slow web speed, this tubular spinning process is very cost-intensive and permits only a limited tube diameter. In addition, it is not entirely possible to achieve a uniform tube diameter and wall thickness, and it is very complicated and expensive to carry out finishing processes, for example, coating the inside of the tubing. In addition, in the field of tubular casings of naturally occurring polymers which are provided with a longitudinal seam, in recent years there have been hardly any publications which give an indication as to how the problems mentioned above could be overcome.

Furthermore, these known tubular casings are not suitable for the manufacture of curved sausages.

For certain types of sausages, the synthetic sausage casings are manufactured from naturally occurring material, in particular based on cellulose, e.g. regenerated cellulose, in a curved or rounded circular shape, i.e., the so-called wreath-shaped casings. The curvature has hitherto been produced by stretching the tube on one side during its manufacture. For example, in one of these processes (U.S. Pat. No. 2,136,566), the seamless shells of coagulated and subsequently regenerated cellulose hydrate gel which have been manufactured in a known manner from viscose are blown up with air, before drying, and wound around a heated cylinder. As a result, one side shrinks, i.e., the side of the spirally wound seamless casing which comes into contact with the hot surface of the cylinder. By this means a certain degree of stability is imparted to the spiral-shaped casing. Drying of the spiral-shaped casing is then brought to completion in a tunnel oven. Spirally wound tubular casings for the manufacture of sausages wound in circles are obtained in this manner.

In another known process for the manufacture of seamless wreath-shaped casings (U.S. Pat. No. 2,925,621), a viscose solution is extruded through an annular-slot die into a spinning bath which exerts a coagulating effect on the viscose. After the required degree of stability has been achieved, the coagulated but not yet completely regenerated tube obtained in this manner is blown up with air or an inert gas and, in the blown-up state, is wound around a cylinder once or several times in a spiral-like manner. This spirally wound tube of coagulated viscose is converted into regenerated cellulose, for example, by immersion in a regenerating bath. Finally, the seamless tube of regenerated cellulose is subjected to the customary purification, after-treatment and drying measures.

Thus, these known curved sausage casings are also manufactured by the tubular spinning process and exhibit the abovementioned general disadvantages of tubes manufactured without seams.

Moreover, it is also known to manufacture seamless wreath-shaped casings by partial shrinkage in the longitudinal direction under the action of heat (U.S. Pat. No. 3,679,435). However, these tubes consist entirely of a synthetic thermoplastic polymer and furthermore are seamless.

SUMMARY OF THE INVENTION

It is therefore an object of the present invention to provide an improved tubular casing, and an improved process for its manufacture. Particularly, it is an object of the invention to provide an improved tubular casing of the abovementioned type which has a glued seam running along its longitudinal axis and can be used for the manufacture of curved or circular sausage casings. It is a particular object to provide such a tubular casing which can be manufactured in a relatively simple and inexpensive manner, for example, at normal room temperatures, with relatively short residence times and without the aid of acids and additional solvents, by the simple step of glueing its two edge regions along the longitudinal axis.

It is also an object of the invention to provide a seamed tubular casing which is suitable for packaging foodstuffs, in particular, sausage mixtures, i.e., the tubular casing and, in particular, the glued seam must withstand exposure to relatively severe mechanical load and to relatively high temperatures, for example, elongation stresses and the action of hot water, and it should not impair the flavor and appearance of the foodstuff.

An essential object of the present invention is furthermore to provide a tubular casing wherein the glued seam is permeable to gas and smoke while simultaneously having a high tear strength, in order to provide a tubular casing which is suitable for use as packaging for foodstuffs to be smoked.

It is furthermore an important object of the invention to provide a tubular casing which, after being shirred and after being deshirred or unfolded as a result of the sausage mixture being stuffed therein, results in a straight sausage, and assumes a curved shape only during the subsequent processes, in particular during smoking or scalding. Such a sausage casing has the advantage that it need not be filled with sausage mixture discontinuously in sections, but can be filled continuously in the form of a long, shirred tube on conventional filling units.

Still another object of the invention is to provide a process for the manufacture of the tubular casings according to the invention.

Finally, it is also an object of the invention to provide a final sausage product, preferably a curved or ring-shaped sausage product, manufactured with the tubular casing according to the present invention.

In accomplishing the foregoing objects, there has been provided in accordance with one aspect of the present invention a tubular casing suitable for containing foodstuffs, comprising a web of material comprising a naturally occurring polymer curved about its longitudinal axis in such a manner that its two longitudinal edge regions lie contiguous to one another or are overlapped to form a seam; a layer of substantially water-insoluble adhesion promoting resin covering either the inside and/or outside surfaces of the web in at least the area of the two edge regions; a strip of film applied to the contiguous longitudinal edge regions or interposed between said longitudinal overlapping edge regions forming the seam, this strip of film comprising a material capable of shrinking predominantly in the direction of its longitudinal axis upon the application of heat; and a layer of a pressure-sensitive adhesive interposed between the strip of film and the edge regions of the web material, whereby the seam is sealed by the strip of film via the layer of pressure-sensitive adhesive and the layer of adhesion-promoting resin. So, in one embodiment, the edge regions overlap one another and the strip of film is interposed between the overlapped edge regions, and in another embodiment the edges lie in edge to edge relationship with one another and the strip of film overlies either the inside and/or outside surfaces of the web.

In still another embodiment the casing is shirred and the seam region is arranged spirally around the longitudinal axis of the shirred tubular casing in at least a part of the tubular casing. In accordance with another aspect of the invention, there has been provided a process for manufacturing a tubular casing of the above-described type, comprising the steps of: curving a web of material about its longitudinal axis in such a manner that its two longitudinal edge regions lie contiguous to one another or are overlapped to form a tube having a seam; before or after the curving step, applying a layer of a substantially water-insoluble adhesion-promoting resin to either the inside and/or outside surfaces of the web in at least the area of the two edge regions; and bonding the two edge regions together by means of a strip of film applied thereto and a layer of a pressure sensitive adhesive interposed between the web and the strip of film wherein the strip of film comprises a material capable of shrinking predominantly in the direction of its longitudinal axis upon the application of heat. Preferably, the process further includes the steps of: filling the tubular casing with a sausage emulsion; sealing the ends of the casing to produce a sausage article; and subjecting the filled casing to a temperature between about 60° and 100° C. for a period of time sufficient to cause the sausage article to take on a bent shape.

In accordance with yet another aspect of the present invention, there has been provided a sausage article produced in accordance with the above-described process.

Further objects, features and advantages of the present invention will become apparent to the person skilled in this art from the detailed description of preferred embodiments which follows, when considered together with the attached figures of drawing.

BRIEF DESCRIPTION OF THE DRAWINGS

In the drawings:

FIGS. 4 and 5 are isolated cross-sectional views of the overlapped portion of different embodiments of a tubular casing which are permeable to smoke;

FIGS. 8 and 8a schematically illustrate a process for the manufacture of the tubular casings according to the invention.

DETAILED DESCRIPTION OF PREFERRED EMBODIMENTS

Figure 1:
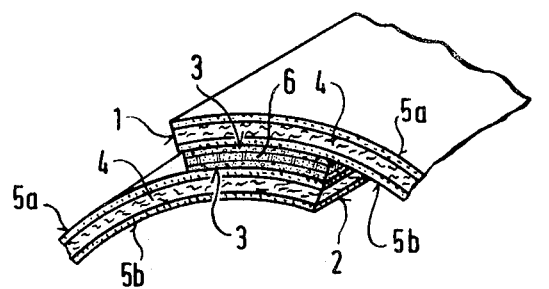
FIGS. 1, 2 and 3 are isolated cross-sectional views of different embodiments of the gluing regions of a tubular casing.

According to the present invention, a sheet-like or web-like rectangular piece of film which is curved around its longitudinal axis, or a correspondingly curved continuous film web, is converted into a tubular casing with a bonding seam running along the longitudinal axis by glueing the edge regions running along the said axis. This glueing operation is effected by overlapping the edge zones. A tape or a strip of film or sheet running along the longitudinal direction (hereinafter referred to simply as a "strip of film") is arranged between these two overlapping edge regions of the tubular casing. For simplicity, instead of "sheet-like or web-like pieces" and "continuous webs", in the following text these elements are collectively referred to by the term "web". The layer containing the adhesive in the overlapping region can be in the form of a tape, filament or strip which is first applied to the edge zones of the web during the manufacture of the tubular casing and/or which is on both sides of the strip of film before producing the bonding seam. In another embodiment, the edge zones are bonded to one another in a manner such that the edges are brought together flush, that is to say that the edge faces are at least essentially pushed together, and are then glued with a strip of film which covers both the edge zones. The strip of film is then on the outer side or inner side of the tubular casing, or strips of film which run congruently to one another are used, one of which being on the inner side and the other being on the outer side of the tubular casing. Before producing the bonding seam, the strip of film has a layer of pressure-sensitive adhesive on one of its two surfaces, which serves to bond the two edge zones which have been pushed together. It is also possible to apply the layer of pressure-sensitive adhesive to the two edge zones.

The strip of film appropriately has a width of about 5 to 15% of the tube circumference and consists of a material which is capable of shrinking at least in the direction of the longitudinal axis under the influence of heat. Preferably, the strip of film is made from a film material which is stretch-oriented at least in the longitudinal direction, e.g., a thermoplastic material such as a polyester, polyvinylidene chloride, polyvinyl chloride, polyamide, polyethylene, polypropylene, polystyrene or polyacrylonitrile film, or a film based on a copolymer or a laminated film of two or more films which are capable of shrinking under the influence of heat. By strip of film, there should also be understood a non-woven material which is capable of shrinking at least in the longitudinal direction under the action of heat, for example, a non-woven fiber material bonded together by an adhesive, mechanically or by means of heat, of spun fibers, filaments or multiple filament yarns of a synthetic thermoplastic material which are deposited randomly or in ordered fashion and are capable of shrinking under the action of heat, or a foamed thermoplastic film which has an open-cell or closed-cell foam structure and is capable of shrinking under the action of heat.

The manufacture of films and fibers which are capable of shrinking in the longitudinal direction under the action of heat is known. See, for example, U.S. Pat. Nos. 2,461,975 and 2,767,435 and British Pat. No. 784,920. For this, the film or the fiber of thermoplastic material is stretched above the flow point and below the crystalline melting point, so that lengthening in the stretching direction takes place, and is cooled in this state, so that the stretched form becomes fixed. While the shaped piece does not change its dimensions at room temperature, the inherent stress incorporated by the stretching can be released by warming, whereupon the film or fiber endeavors to regain the dimensions present before the stretching operation.

An ability of the film or fiber to shrink in the transverse direction to an extent which is only slight in comparison with the ability to shrink in the longitudinal direction is of no disadvantage for achieving the objects of the invention, since the width of the film or fiber is relatively small compared with its length. However, if the ability of the film to shrink in its transverse direction is greater than its ability to shrink in its longitudinal direction, the strip of film is cut at right angles to the web direction of the film, so that the ability of the strip of film to shrink is then greater in its longitudinal direction.

If the shrinking ability of the strip of film running along the longitudinal axis of the tubular casing is brought into effect by warming, the tubular casing curves into a wreath shape. This operation is carried out only after shirring the tubular casing and filling it with sausage mixture, since the tubular casing which has not yet been curved can be shirred in a relatively simple manner and is easy to fill. Moreover, since the sausages must be boiled, scalded and/or smoked, this step provides the necessary heating so that the filled sausage casings then assume the wreath shape. Therefore, it is preferred to use a stretched strip of film which has the ability to shrink upon warming to a temperature below about 100° C., in particular, to temperatures between about 60° and 85° C.

The longitudinal shrinkage of the strip of film which results at this temperature and is triggered off over a period of about 10 minutes is suitably in the range from about 5 to 80%, preferably from about 10 to 40%, and in particular from about 15 to 30%, depending on the desired radius of curvature.

Such a material is, for example, a polyethylene terephthalate film which shrinks in the longitudinal direction by about 25% at 90° C./10 minutes, which has been stretched in the lengthwise direction at a stretching ratio of about 1:3, and which is about 10 to 40 μm thick.

Microporous thermoplastic films which are capable of shrinking under the action of heat are also suitable. This category is to be understood to include membranes with a pore diameter such as that of, for example, membranes which are employed in reverse osmosis, ultrafiltration, dialysis or hemofiltration or as battery or fuel cell diaphragms. Such microporous films are manufactured, for example, by mixing a pulverulent substance, for example, polystyrene, starch, sugar, sodium chloride or sodium bicarbonate, with the base material, forming a sheet-like structure and extracting the pulverulent substance in order to form pores. See e.g., U.S. Pat. No. 3,852,224. It is also possible to expose finely pulverulent thermoplastics to elevated temperatures, whereby a substance with a microporous structure is obtained by sintering. By means of another process, the gas absorbed in a thermoplastic is expanded under the action of heat, or alternatively, the gas can also be produced by adding an agent which forms a gas under the action of heat. Porous sheet-like structures can also be formed by mixing an organic polymer with two volatile solvents which are miscible with one another, spreading the mixture out to form a layer and evaporating the solvents, whereupon the polymeric material coagulates to form a porous structure. In this process, the polymer is sparingly soluble or insoluble in one of the solvents. Finally, processes are also known in which the polymeric material is dissolved in a solvent and, in order to achieve coagulation, the solution is then brought into contact with a liquid precipitating agent which is miscible with the solvent. In a manner similar to the films and fibers described above, an ability to shrink under the action of heat is imparted to these microporous films by stretching in the longitudinal direction at elevated temperature. However, their shrinkage capacity should not exceed about 15%, since more severe stretching leads to an adverse change in pore structure. A shrinkage value in the range from about 5 to 15% is most preferred for microporous films.

For foodstuffs which are to be smoked, for example, sausages which are intended for boiling and from which the casings may be removed before consumption or certain types of cheese, particularly suitable materials are perforated, punched or needle-punched strips of film, or the said non-woven materials, foamed films and microporous films which, because of their structure or their chemical composition, are capable of allowing the smoking fumes to pass through the bonding seam of the tubular casing. Any of these materials may be used as long as they are sufficiently capable of shrinking under the action of heat. Tapes of a close-mesh woven fabric, network or lattice which, for example, are woven from filaments in the warp and weft and are capable of shrinking under the action of heat, are also suitable as strips of film which are used for bonding the edge zones and which are permeable to smoke and capable of shrinking under the action of heat.

Compact strips of film of a material which is permeable to smoke and capable of shrinking under the action of heat can also be used, in which case it is not necessary for the strip of film to have an additional structure which is permeable to smoke, for example, in the form of pores or perforations.

In addition, in the case of a packaging casing which is to be used for foodstuffs which are to be smoked, the layer containing the adhesive and the tubular casing are both to be provided with a sufficient permeability to smoke, as described below.

Base materials which are used for manufacture of the packaging casing are, in particular, webs based on cellulose, by which there are to be understood cellophane, regenerated cellulose or cellulose hydrate and also cellulose derivatives, such as cellulose ethers, and also webs of proteins, carbohydrates, collagens, alginates, starches and other naturally occurring polymeric materials. Thus, cellulose webs which have been manufactured by the viscose process (U.S. Pat. No. 3,884,270), by denitration of cellulose nitrate or hydrolysis of other cellulose esters, for example, deacetylation of cellulose acetate with aqueous or alcoholic alkali solution (U.S. Pat. No. 3,546,209) can be employed. Other cellulose materials, such as cellulose ethers, for example, alkyl- or hydroxyalkyl-cellulose, or mixed ethers can also be glued to form tubes.

It is also possible to use webs which contain a fiber reinforcement, in particular a web-like fiber reinforcement, for example, a paper web, including those containing fibers such as are used in the manufacture of paper or rice paper, or ckontaining natural fibers, such as hemp fibers or flax fibers, or containing synthetic fibers, such as polyamide fibers, polyester fibers or polyacrylonitrile fibers. The web-like fiber reinforcement is, for example, a textile structure such as a non-woven fiber material which has been manufactured by bonding together (e.g., by an adhesive, mechanically or by means of heat) spinning fibers, filaments or multiple filament yarns of natural or synthetic materials which are deposited randomly or in an ordered fashion, or the reinforcement is a woven material, network, lattice, knitted material or the like. However, webs without fiber reinforcement are preferred.

The fiber web is preferably treated on both sides with a viscose solution. In particular it is immersed in a viscose solution or coated with a viscose solution, for example, using nozzles, rollers or spraying devices, and the viscose solution is then converted into regenerated cellulose. It is also possible to incorporate into the viscose from about 10 to 80% by weight of reinforcing fibers, which suitably have an average fiber length of about 0.05 to 15 mm. The fibers consist of organic synthetic fibers, natural fibers, for example, cotton fibers, or of fibrids. See, e.g., U.S. Pat. No. 2,999,788. The viscose containing the fibers is then extruded through a die into the coagulating bath whereupon a gelatinous web is formed.

The viscose solution is usually prepared by reacting an alkali metal cellulose which has been obtained from cellulose and sodium hydroxide solution, with carbon disulfide in an alkaline medium. The solution usually still contains from about 4 to 20% by weight of cellulose. After the ripening, the viscose is spun, i.e., coagulated. The spinning bath contains, for example, 10 to 20% by weight of sulfuric acid and also sodium sulfate and/or ammonium sulfate. See e.g., British Pat. No. 1,240,560.

In further stages, the fiber-reinforced web-like product consisting of viscose gel is regenerated to cellulose hydrate gel in an acid medium, for example, in dilute (less than or equal to 5% by weight) sulfuric acid, and the cellulose hydrate gel is washed with water to remove acid and salts, desulfurized, for example, with sodium sulfite solution, optionally passed through a bleaching bath and finally passed through a plasticizing bath containing, for example, aqueous 10 to 20% strength glycerol, sorbitol or glucose solution. See e.g., French Pat. No. 1,385,394.

The cellulose hydrate gel is converted into regenerated cellulose by intensive drying at 90° to 140° C., and the regenerated cellulose is adjusted to a water content of about 5 to 10% by weight by conditioning. The cellulose hydrate webs are typically 20 to 50 μm thick, corresponding to a weight per unit area of 27 to 75 g/m$^2$.

It is also possible to employ an adhesion promoter for the adhesive. The term adhesion promoter is to be understood as including, in the conventional manner, substances or substance mixtures which are applied to one or both of the gluing surfaces before application of the adhesive, in order to improve the adhesion between the adhesive and the gluing surfaces. In the present case, use of an adhesion promoter has the object of anchoring the layer of pressure-sensitive adhesive to the web in a moisture-resistant manner. It is employed between the adhesive layer and the web.

Although, in principle, the adhesion-promoting layer of resin would only have to be in the region of the surfaces of the continuous web which are to be glued, for industrial reasons it is expedient to provide the entire area of one surface, and even for certain applications or overlapping glueings, both surfaces of the web, with one or two different adhesion-promoting layers of resin. In addition, on the surface which later forms the inner side of the tubular casing, the web can also have a customary agent for improving the ease of peeling off the tubular skin, or a layer which is impermeable to gas. The first agents include, for example, water-soluble proteins, such as gelatin, egg albumin and glutenin. However, these agents are only necessary with certain adhesion-promoting resins. If hardened, cationic thermosetting resins are present on the inner side of the tubular casing, an adequate ease of peeling off is already ensured without an additional agent.

The essentially water-insoluble, adhesion-promoting resin is preferably a hardened, cationic thermosetting resin which is essentially water-soluble in the non-hardened state and can be converted into a water-insoluble state by a progressive condensation reaction by the action of heat. See, e.g., U.S. Pat. No. 3,378,379. Copolymers containing vinylidene groups (U.S. Pat. Nos. 2,748,027, 2,961,323, 2,961,340, 3,108,017, 3,144,425 and 3,826,676 and German Offenlegungsschrift No. 2,832,926) together with pressure-sensitive adhesives also give outstandingly strong seams when the seam is glued to form the tubular casing. With such resins, an additional barrier effect against steam and oxygen is also achieved. Polyurethane resins, nitrocellulose and other polymers, known as water-insoluble anchoring agents can likewise be employed.

The choice of water-insoluble, adhesion-promoting resin depends, inter alia, on the intended use of the tubular casing. For sausages intended for boiling, the casings should be permeable to steam and smoke, and therefore hardened, cationic thermosetting resins are preferably used as the anchoring agent. To accomplish this, for example, a web of cellulose hydrate is coated with an aqueous solution which contains up to about 25% by weight of a dispersible thermosetting resin, and the coated material is heated to a temperature of about 65° to 125° C. until the moisture content is less than about 10% by weight. The resin is hardened to its water-insoluble form by the heating, and is permanently bonded to the surface of the web. Preferably, in the manufacture of the web of cellulose hydrate, the coating solution is applied to the already regenerated, but not yet dried web of cellulose hydrate gel. This application can be effected prior to, simultaneously with or after the treatment of the gelatinous web with a plasticizer, such as, for example, a polyol. The layer of resn has a weight per unit area of from about 30–300 mg/m², preferably from about 40 to 75 mg/m².

Lower aliphatic or aromatic hydrocarbons, lower alcohols or esters, or mixtures of these solvents are employed as suitable solvents for the thermosetting resin. It is advantageous to use an aqueous solution or dispersion.

If desired for certain uses, an additional water-repellent resin, such as paraffin, montan wax or carnauba wax, and/or suitable thickeners, such as cellulose ether or starch, can be applied to the tubular casing together with the thermosetting resin.

The tubular casing can also be printed with inscriptions or decorative patterns before, but preferably after, application of the thermosetting resin and before the glueing. Not only the printing processes customary in the manufacture of seamless sausage casings can be used, but also other printing possibilities are advantageously available, since, in the present case, the flat web can be printed before shaping of the tube.

The coating of thermosetting resin is, for example, free from pigments and organic dyes and thus forms a clear layer through which any printing remains clearly visible. However, it is also possible to use a transparent organic dyestuff, in order to impart a corresponding color to the packaging casing.

If desired, in the region of the bonding seam, the layer on the tubular casing may in addition to the thermosetting resin contain a pigment, a plasticizer for the thermosetting resin and/or a hardening agent for the thermosetting resin. The thermosetting resin and the plasticizer are taken up in a suitable liquid solvent or dispersing agent, which advantageously can be evaporated at a temperature at which at least preliminary hardening of the resin can simultaneously occur.

Examples which may be mentioned of thermosetting resins are: urea/formaldehyde, melamine/formaldehyde and phenol/formaldehyde resins. Preferred plasticizers which are used for these thermosetting resins are soft resins of the alkyd type which cannot be hardened, dibutyl phthalate, tricresyl phosphates or dibutyl sebacate.

Hardeners which can be employed for the thermosetting resins are, for example, ammonium thiocyanate, toluenesulfonic acid, maleic acid or lactic acid. These compounds act as catalysts in the hardening of the thermosetting resins.

Particularly preferred thermosetting resins are condensation products of polyamide-polyamines, or condensation products of aliphatic polyamines or of polyamides with bifunctional halohydrins or derivatives thereof, such as, for example, epichlorohydrin, such as are described, for example, in U.S. Pat. No. 2,573,956 or in British Pat. Nos. 865,727 and 908,205. A particularly suitable resin is, for example, the reaction product of an aliphatic 2,6-polyamide, ethylenetriamine and epichlorohydrin.

Possible polyamines are simple alkylenediamines, or polyalkylenepolyamines, such as, for example, diethylenetriamine, triethylenetetramine, tetraethylenepentamine and the corresponding polypropylene-polyamines, and polybutylenepolyamines, such as dibutylenetriamine. To manufacture the corresponding chlorohydrin resins, the polyamines are reacted with more than one mole of epichlorohydrin per mole of polyamine. In general, from about 1.5 to 4.0 moles of epichlorohydrin, and more typically from about 2 to 3 moles, are used. The reaction is carried out in aqueous solution at a moderately elevated temperature (about 50° C.), until the desired degree of viscosity is reached. Reaction products of epichlorohydrin and dipropylenetriamine or bis-(3-aminopropyl)methylamine are preferably used, with from about 2.8 to 3.8 moles of epichlorohydrin being reacted with each mole of polyamine.

The polyamide-polyamines are condensation products of a saturated, aliphatic, dibasic acid which has 3 to 8 carbon atoms in the molecule and one of the above-mentioned polyamines which has at least one secondary and two primary amine groups such as, for example, the abovementioned polyalkylenepolyamines. Diglycolic acid, succinic acid, glutaric acid and adipic acid are preferably used as the dibasic acid. It is also possible to use mixtures of dibasic acids. The mixtures of the acids can also contain acids with more than eight carbon atoms in the molecule, as long as the proportion of these acids in the mixture does not prevent the polyamine-polyamide manufactured therefrom from being truly soluble or at least colloidally soluble in water. A portion of the polyamines which are reacted with the dibasic acid can be replaced by alkylenediamines. The portion of alkylenediamines can be up to about 30%. The reaction between the polyamine and the dibasic acid is carried out at about 110° to 250° C., and usually at about 160° to 210° C. About 0.8 to 1.4 moles of the acid are used per mole of polyamine. The resulting polyamine-polyamides are reacted with from about 0.5 to 1.8 moles of epichlorohydrin per secondary amino group, in aqueous solution, and from about 0.9 to 1.5 moles of epichlorohydrin are preferably used.

The resin is applied to the web provided for the coating in the form of an aqueous solution which contains from about 0.3 to 2.0% by weight, preferably from about 1 to 1.3% by weight, of the chlorohydrin resin. In the case of a cellulose web, which is optionally fiber-reinforced, the resin is preferably applied to the still moist, not yet dried web of cellulose hydrate gel. However, it is also possible to apply the aqueous solution after the cellulose web has been dried, which indeed has the advantage that solutions with a lower content of resin are required to achieve the same effect. However, this sometimes leads to non-uniform impregnation. After application of the aqueous solution of the anchoring agent, the web is dried at a moderate heat (e.g., about 100° C.).

The permeation properties of the packaging casing in the gluing region are not influenced, or they are influenced only to an inconsiderable degree, by the anchoring layer of hardened, cationic thermosetting resin. These properties are of particular importance for the permeability towards steam and smoking fumes if the tubular casing is to be used for storage-stable sausages or sausages which are to be boiled. If the permeability were too low, for example, the typical reddish-brown color shade of the smoked sausage meat would not be obtained.

The term pressure-sensitive adhesive is intended, in general, to mean a permanently tacky substance which spontaneously adheres to the surfaces of most materials under even a slight pressure when present in a form free of solvents or dispersing agents. In the present case, such an adhesive is applied to the edge zones of the web which are to be bonded and/or to the strip of film which is capable of shrinking under the action of heat. It is applied either directly in the form of a dispersion or solution, for example, in a hydrocarbon fraction having a boiling range of 65° to 95° C., acetone, ethyl acetate, toluene or chlorinated hydrocarbons, or in solvent mixtures, for example, acetone/hydrocarbons, or as a melt. However, it is also possible to apply initially a thin film of the pressure-sensitive adhesive layer to a carrier tape, which consists of a material provided with an anti-adhesive finish, for example, a material of silicone paper or of siliconized plastic film. The pressure-sensitive adhesive is then transferred to the edge zones of the web which are to bonded and/or to the strip of film, and then the carrier tape provided with the anti-adhesive finish is pulled off from the pressure-sensitive adhesive film. In a preferred embodiment, the pressure-sensitive adhesive is applied to the strip of film used for bonding the edge of the web which runs along the longitudinal axis. The strip of film is then pressed onto the edge zones in order to become glued to the edge zones with its pressure-sensitive adhesive layer.

In the case where the edge zones overlap, a strip of film with a coating of pressure-sensitive adhesive on both sides is preferably used. One of the two tacky surfaces of this strip of film is glued along the longitudinal axis to the entire surface of one of the two edge zones of the continuous web, while the other adhesive surface of the strip of film is still covered with a protective tape which can later be pulled off. The tube is then shaped by overlapping the two edge zones of the web which run along the longitudinal axis, with the strip of film being in the overlapping zone between the edge zones. After the protective tape has been pulled off from the second tacky surface, this surface is stuck to the second edge zone of the web.

In contrast to the procedure for coating the web with the adhesion-promoting resin, the pressure-sensitive adhesive should not be applied over the entire surface of the web, but only in the desired gluing region, i.e., along the two edges running along the longitudinal axis and/or to the surface of the strip of film.

Raw materials for the pressure-sensitive adhesive are preferably polyacrylates or polymethacrylates, but in principle other pressure-sensitive adhesives are also suitable, as long as they fulfill the necessary requirements, for example, with regard to the good resistance to boiling and physiological acceptability. Dispersion-type pressure-sensitive adhesives, for example, those based on polyacrylates or vinyl acetate copolymers, optionally with the addition of suitable resins, or hot-melt pressure-sensitive adhesives which, in addition to suitable resins, contain ethylene/vinyl acetate copolymers and styrene/butadiene or styrene/isoprene block copolymers, are also in principle suitable; however, these pressure-sensitive adhesives do not always satisfactorily fulfill the necessary requirements for as broad an area of application as the first mentioned pressure-sensitive adhesives.

The pressure-sensitive adhesive consists of a highly polymeric base resin, which determines the cohesion properties and the specific adhesion, and usually one tackifying resin which can be replaced by low-molecular portions of the base polymer. Such a resin is predominantly added in dissolved form to the base resin. The following resins, for example, can be used: naturally occurring resins, such as balsam resins, modified naturally occurring resins, for example, those based on hydroabietyl phthalate or esters of colophonium, and polyterpene, terpenephenol, cumarone, indene, ketone and hydrocarbon resins. The addition of tackifying resins indeed increases the surface tackiness and peel strength, but in some cases a reduction in cohesion can thereby occur. To increase the cohesion, the heat distortion resistance and shear resistance of the gluing, it is, for example, possible for the base resin to be crosslinked after it has been applied to the bonding strip of film or to the surface of the web, for example, with chemical additives at room temperature or by means of heat (e.g., by warming to 130° to 140° C. for 5 to 15 minutes) in which case a considerably improved resistance of the glued seam to hot water can also be achieved. To achieve cross-linking, it is necessary that a crosslinking agent which undergoes a crosslinking reaction with reactive groups of the polymer be added to the adhesive, or that there is used as the base resin a homopolymer or copolymer having reactive, i.e., crosslinkable, comonomers which have functional groups, for example, carboxyl, amide, amino, methylol or hydroxyl groups, which improve the adhesion properties and/or permit limited crosslinking of the adhesive film. In general, these components with functional groups are indeed advantageous, since they increase the cohesion of the pressure-sensitive adhesive film; however, they are not absolutely necessary. Examples of such copolymers which may be mentioned are: (1) anionic copolymers of acrylates, vinyl acetate, an unsaturated carboxylic acid, such as acrylic acid, methacrylic acid or itaconic acid, and a glycidyl compound, such as glycidyl acrylate or glycidyl methacrylate; (2) copolymers with bifunctional monomers, such as triethylene glycol dimethacrylate or diacrylate, and tetramethylene glycol diacrylate or dimethacrylate; (3) copolymers of acrylates, vinyl 1-halogenocarboxylates, such as, for example, vinyl chloroacetate, 1,2-unsaturated carboxylic acids, such as acrylic acid, or unsaturated dicarboxylic acids, and, as the fourth component, a polymerizable unit containing hydroxyl groups; and (4) copolymers of N-methylolacrylamide (or N-methylolmethacrylamide) and acrylates (or methacrylates) which still contain free, nonesterified carboxyl groups, this copolymer being crosslinked by means of heat, with water being split off. Furthermore, N-(1,1-dimethyl-3-oxo)-butylacrylamide, having the formula $CH_2=CH-CO-NH-C(CH_3)_2-CH_2-CO-CH_3$ can also be used as the reactive comonomer. The double bond permits copolymerization, while the keto group and the H atoms adjacent to the keto group enable the crosslinking reaction to take place. Crosslinking can be initiated by heating in the presence of peroxides. A suitable crosslinkable pressure-sensitive adhesive contains, for example, a copolymer based on acrylates, containing as comonomers acrylonitrile and monomers which contain carboxyl groups and are already crosslinked in the cold, i.e., at room temperature, when an alkali or a salt of a monovalent or polyvalent metal is added, such as, for example, ammonia, an alkali metal hydroxide solution or an aluminum salt. Other comonomers which may be mentioned are copolymers containing acrylic acid hydrazides and acrylate hydrazones in acrylates.

In the case of tubular casings of cellulose hydrate, polyacrylates are particularly advantageously used as the pressure-sensitive adhesives, the acid groups being esterified with one or more aliphatic alcohols having 1 to 12 C atoms, and in particular, those having 4 to 8 C atoms, such as, for example, butyl alcohol or 2-ethylhexanol.

The adhesive layer can also contain other nontacky additives, such as are customary per se in adhesives, for example, highly viscous thickeners based on homopolymers or copolymers of polyacrylic acid salts or polyvinylpyrrolidone; preservatives, in order to protect the adhesive layer from attack by microorganisms; wetting agents; plasticizers, for example, based on phthalates obtained with straight-chain alcohols (butanol) or branched alcohols (2-ethylhexanol); fillers, such as kaolin, glass beads, chalk, quartz flour, microdolomite, baryte, fine-grained sand and zinc oxide; and pigments as well as organic and inorganic dyestuffs in the form of powders or flakes.

The total width over which the adhesive is applied is chosen between about 3 to 70 mm, depending on the desired strength values and diameter, and is advantageously from about 5 to 15% of the final circumference of the casing. If a strip of film which is capable of shrinking under the action of heat and which is coated with a pressure-sensitive adhesive layer is used for the overlap type bonding of a butt seam formed from the two edge zones of the web, it is correspondingly necessary for the adhesive to be applied over an area twice as wide. The thickness of the adhesive layer is from about 20 to 150 $\mu$m, preferably from about 40 to 50 $\mu$m.

Bonds produced with pressure-sensitive adhesives can, as is known, be separated and joined together again several times. It is therefore completely surprising that precisely these adhesives in combination with one of the above-mentioned adhesion-promoting resins, as the priming layer, form a sufficiently strong seam when webs are glued to form tubular casings. In particular, during manufacture of sausages, the seam is exposed to hot water at about 80° C. for a relatively long period while the sausage is scalded, and likewise, during shirring, filling, twisting off, tying off or clipping and the like, the seam must withstand high mechanical load and stresses. Under these conditions, the seam must withstand high mechanical loads and stresses, and changes in dimension occur. Nevertheless, it has been found that this combination of adhesion-promoting resin and pressure-sensitive adhesive, actually because of its elastic character, is even superior to the resins described earlier. Thus, because they are permanently tacky, the pressure-sensitive adhesives have the advantage that they can be fused together rapidly and simply on the parts to be bonded, with a sufficient adhesive strength against shearing forces.

The term shearing forces means the action of tangential tensile forces on the glued seam, perpendicular to the longitudinal axis of the tubular casing.

It has been found that the tear strength of glued points on the order of 35 to 45 N/15 mm of sample width is in the same range as the tear strength of the material from which the tubular casing is made. However, it has been found that a layer of pressure-sensitive adhesive applied in the customary manner usually does not ensure sufficient permeability to smoke. After smoking, glued tubular casings, for example, of regenerated cellulose, filled with sausage meat exhibit no smoked color or only an incomplete smoked color in the region of the full surface area glued seam.

It is known that the smoked coloration arises by reaction of phenols and carboxyl compounds with proteins, and its intensity and stability depend in particular on the water content of the casing, the pH value of the substrate and the period and level of heating. Therefore, these substances and the volatile carboxylic acids which form the main component of the smoke and which are particularly decisive for the coloration must be able to pass through the seam region of the tubular casing.

In order to improve the permeability to smoke, it has therefore been proposed according to the invention to apply the layer of pressure-sensitive adhesive to the web or the strip of film not over the full surface area, but with interruptions or exclusions. The layer of pressure-sensitive adhesive can also be applied in strips or as a punctiform screen pattern, for example, with a profiled roller which imparts a structure to the pressure-sensitive adhesive layer. The applicator roller can also have a textile structure or a brush surface.

A particular advantageous application of a dispersion of pressure-sensitive adhesive, for example, in a regular punctiform or linear grid structure is by rotary screen printing or gravure printing which can be carried out at a rate of up to 100 m/minute. A layer thickness of the pressure-sensitive adhesive of from about 25 to 30 $\mu$m with a surface coverage of 40 to 60% results in an excellent permeability to smoke coupled with sufficient strength of the bonding seam. The same success is achieved with openings, pores or perforations in the layer of pressure-sensitive adhesive and optionally also in the edge regions of the web and of the strip of film. It is also possible for the diameter of these passages to be in the micrometer or nanometer range. These openings, pores or perforations in the adhesive layer, in the web or in the strip of film can be produced mechanically before or after producing the tubular shape or glued seam, for example, by stamping, embossing, hole-punching or needle-punching the edge zones or the strip of film covered with the layer of adhesive, with the diameter of the perforations, being about 0.2–1.2 mm. Suitable passages can also be produced by a chemical route, for example, by partially dissolving the layer of pressure-sensitive adhesive away from the edge zones or from the strip of film before forming the glued seam.

It is furthermore possible to incorporate into the pressure-sensitive adhesive a pulverulent substance which can be extracted, for example, a polymer such as starch, polystyrene or sugar, or a salt, for example, sodium chloride or sodium bicarbonate. After application of the pressure-sensitive adhesive to the strip of film or to the edge zones of the web which run along the longitudinal axis, this substance is dissolved out to form pores in the layer of pressure-sensitive adhesive. It is also possible to admix with the pressure-sensitive adhesive an additive which is permeable to smoke, for example, porous substance or organic pigments with a high permeability to smoke or gas. Precipitation reactions such as those which are known for the manufacture of microporous films and membranes can also improve the permeability of the layer of pressure-sensitive adhesive to smoke or gas. In this embodiment, the pressure-sensitive adhesive is mixed in two volatile solvents which are miscible with one another, the mixture is spread onto a carrier film or onto the edge zones to be bonded and the solvents are evaporated, whereupon the polymeric material coagulates to form a porous structure. The pressure-sensitive adhesive or the polymeric parts of the pressure-sensitive adhesive are sparingly soluble or insoluble in one of the solvents. Alternatively, it is also possible for the pressure-sensitive adhesive to be dissolved or dispersed in a solvent, and then, for example, after application to the bonding surfaces of the web, the solution is treated with a liquid precipitating agent which is miscible with the solvent and which serves to coagulate the solution. In order to improve the permeability to gas and smoke, it is also possible to add to the layer of pressure-sensitive adhesive finely pulverulent thermoplastics which form a microporous structure in this layer at elevated temperature by sintering. The permeability of the layer of pressure-sensitive adhesive to gas and smoke can also be improved by adding gases, for example, air, nitrogen, carbon dioxide or fluorinated hydrocarbons in the form of small bubbles which are optionally expanded under the influence of heat. This layer of pressure-sensitive adhesive is sprayed, for example, onto the edge zones of the web or onto the strip of film. The gas can also be produced by adding an agent which forms a gas under the influence of heat, for example, azo compounds or carbonates.

The layer of pressure-sensitive adhesive may also in some cases additionally contain a textile sheet-like, strip-like, chain-like or filament-like structure, for example, a non-woven fiber substance (which is bonded together by an adhesive, mechanically or by means of heat) made of spinning fibers, filaments or multiple filament yarns of natural or synthetic material which are deposited randomly or in an ordered fashion, or a woven material, network, lattice or the like or a sponge or foam film, in particular, with an open-cell structure.

It has been found, surprisingly, that the embodiments described for the tubular casing with a good permeability to smoke in the gluing region are sufficiently stable and have a sufficient resistance to mechanical stress and heat. However, if a tubular casing which is impermeable to gas is to be manufactured, the adhesion-promoting water-insoluble layer consists of a vinylidene resin which is typically present with a weight per unit area of 3 to 12 g/m$^2$. These resins include film-forming resins which are obtained by copolymerization of monomers, wherein at least one component contains a vinylidene group. In general, film-forming vinylidene resins which contain at least about 5% by weight, but preferably at least about 80% by weight, of vinylidene chloride in the polymerized molecule can be used. Comonomers which may be mentioned are: vinyl chloride, vinyl bromide, vinyl acetate, vinyl propionate, vinyl chloroacetate, alkyl acrylates or methacrylates, such as, for example, methyl, ethyl, propyl, butyl, isobutyl, methoxyethyl or chloroethyl acrylate or methacrylate, methyl vinyl ketone, methyl isopropenyl ketone, acrylonitrile, methacrylonitrile, styrene, vinylnaphthalene, ethyl vinyl ether, butyl vinyl ether, N-vinyl phthalimide, N-vinyl succinimide, N-vinylcarbazole, methylene-diethyl malonate, unsaturated organic acids, such as itaconic acid, or mixtures of these compounds. In addition to vinylidene chloride, the copolymer can contain one to three of these comonomers.

The vinylidene resin can also contain customary waxes, for example, those based on esterified montanic acids, polyolefin waxes or those based on oxazoline, and/or customary fillers, for example, kaolin, in particular kaolin which has been rendered hydrophobic, silicic acid or calcium carbonate (chalk) with a preferred average particle size of from about 1 to 3 μm.

The vinylidene resin or a mixture of the vinylidene resins is used with or without other resins and with or without a plasticizer, such as, for example, esters of phthalic acid, such as dibutyl phthalate, or esters of citric acid, such as tributyl acetyl-citrate, or of sebacic acid or tartaric acid, such as diisobutyl tartrate.

The vinylidene resin can be applied to the carrier web with an anchoring agent customary for this purpose, for example, one of the above-mentioned hardened, cationic thermosetting resins. Alternatively, the vinylidene resin is applied directly in the form of aqueous or non-aqueous mixtures, such as dispersions or emulsions, or in the form of a latex, or in the form of solutions in water or organic solvents or in the form of melts. The carrier web of regenerated cellulose can be in the dried state, in the remoistened state or in the not yet dried gelatinous state. After application, the dispersing agent or solvent is removed, for example, by heating with hot air and/or by infra-red heating. The web is usually dried to a moisture content of less than about 15% by weight, preferably from about 5 to 10% by weight. Further sintering of the coating at elevated temperature is only necessary if particularly firm adhesion of the coating to the carrier is desired. In general, a coating thickness in the range from about 0.05 to 0.5 mm is sufficient.

Tubular casings provided with vinylidene resins as an anchoring layer are essentially impermeable to gas and are suitable, for example, for sausages of the liver sausage type.

For packaging meat products in the form of sausage emulsions, as is known, shirred, seamless tubular casings are used which progressively unfold as the sausage composition is stuffed in. These shirred casings, also called sticks or hollow rods in the trade, have hitherto been manufactured from long, seamless tubes which are conveyed in the direction of their longitudinal axis and are shirred against an opposing force. The length of the shirred casing is usually only about 1 to 3% of the original length.

While curved sausage casings usually cannot be shirred or can be shirred only with difficulty, the tubular casing according to the invention provides this possibility. This is particularly surprising because difficulties were to be expected during shirring due to the thickening in the region of the gluing as a result of overlapping of the edges or of the tape covering the two edges. The tubular casings manufactured in the examples are shirred, for example, by the process known from U.S. Pat. Nos. 3,988,804 and 4,185,358, and using the device described therein. According to this process the force used for shirring is applied by at least one element rotating around the longitudinal axis of the tubular casing. In particular, the element used for shirring is continuously in force-transmitting engagement with the tubular casing during the shirring operation and transmits to the tubular casing the pressure which is sufficient to form a stick which is flexurally rigid. Before the actual shirring operation, an impression in the form of an exact, continuous helix is advantageously imprinted on the casing to be shirred. It is expedient to apply a lubricant and/or moistening agent to the external surface of the tubular casing to be shirred before the shirring operation. A suitable device for this process consists of a shirring organ and an abutment, the shirring organ comprising an annular member which surrounds the tubular casing and can be rotated around it. The element which is used for shirring and which is in engagement with the tubular casing is attached to the shirring organ.

The element used for shirring is preferably designed as a helically wound projection in the cylindrical inside of the annular member. In particular, the annular member has a helically wound inner groove into which is inserted a correspondingly threaded element which stands out from the cylindrical inner side of the casing as a screw thread. This threaded element is appropriately made of a material with advantageous slip properties, and is of a multi-thread in design. The annular member and the helically threaded projection are usually made as one piece. Reference is made to the two U.S. Patents mentioned above for details of this device. However, as a modification of the process described therein, in the case of the tubular casing of the present invention it is advantageous not to secure the casing against twisting about its axis and to control continuous twisting of the casing about its axis. This is effected, for example, by using a shirring mandrel which is smaller than that customarily used, so that the seam zone, which is relatively thick as a result of the adhesive strip or as a result of the overlapping, is arranged spirally around the longitudinal axis of the shirred tubular casing. It is possible to achieve a shirring ratio of from about 1:70 to 1:80.

This advantageous spiral-like twisting of the casing and the resulting twisting of the relatively thick seam zone around the lengthwise axis of the casing during the shirring operation are also effected without problems using other shirring devices which are known per se, such as those described, for example, in U.S. Pat. Nos. 2,819,488, 3,619,854, 3,594,857 and 3,766,603. The number of turns per 10 m of tube length is appropriately between about 0.5 and 10, and is chosen according to the degree of thickening in the seam zone and the width of the strip of film which is capable of shrinking under the action of heat.

The shirred tubes are filled (about 20 m/minute) with a sausage meat of the type used for sausages intended for boiling or scalding and are wound up mechanically, scalded at about 70° to 80° C. and/or smoked at about 65° to 75° C. and cooled with water.

When the filled sausage casing is warmed, the ability of the strip of film to shrink is brought into action, and the sausage casing assumes a curved shape. The radius of curvature depends, above all, on the degree of shortening of the strip of film during shrinkage. The period over which the casing is subjected to the action of heat and the material of the strip of film are also of importance.

After cooling, there are obtained curved or ring-shaped sausages which are of uniform diameter and have a casing which lies closely against the sausage composition and which can be peeled off. After the sausage casing is peeled off, the sausages retain their curved shape.

If the tubular casing is filled with particularly sensitive foodstuffs, which usually require sterilization, the customary methods, such as, for example, heat treatment or high-frequency radiation can be applied and, if appropriate, the shrinkage thereby triggered.

The tubular casings of the invention can be produced at a higher speed than hitherto. For example, in the case of the manufacture of webs of regenerated cellulose by the viscose process, the spinning process can be carried out more rapidly, as can coating of the webs with the water-insoluble resin and printing. In addition to flexographic printing, high-grade gravure printing is also possible. Furthermore, the piece or web can be printed with an all-round print or with a front and back print. The flavor of the sausage composition is not affected when the casing is used as a sausage casing. The sausage casing exhibits a high resistance to elongation stresses and volume stability during filling with a sausage emulsion, handling and processing. It can also be stored at low temperatures, and can easily be cut up.

The tubular casing can furthermore be used for the manufacture of curved sausages, for which it can be employed in the shirred form in the customary, continuously-operating sausage-filling machines, because it assumes the wreath shape only in the preserving process steps.

The following examples will serve to further illustrate the present invention.

EXAMPLE 1

One surface of a web of regenerated cellulose which is prepared by the viscose process and has a thickness of 41 $\mu$m, a weight per unit area of 60 g/m$^2$, a water content of 7% and a plasticizer content (glycerol) of 19% by weight is coated with a 1% strength aqueous solution of a thermosetting resin (Resamin VHW 61/1 from Messrs. Cassella) on a customary coating unit with roller applicators and drying stations. The resin is a reaction product of aliphatic 2, 6-polyamide, ethylenetriamine and epichlorohydrin. After drying the web at about 125° C. in a stream of air, a layer of resin with a weight per unit area of 50 mg/m$^2$ remains.

The coated web is cut into tapes 63 mm wide, and the tapes are curved, using shaping templates, to form a tube which is supported by a pipe surrounding the tube. The faces of the edges of the web which run along the longitudinal axis touch each other. The surface coated with resin is on the outside of the tube. For manufacture of a strip of film which is capable of shrinking under the action of heat and has a pressure-sensitive adhesive on its surface, a 25 $\mu$m thick polyethylene terephthalate film which is biaxially stretch-oriented and has a shrinkage of 20% in the longitudinal direction and 18% in the transverse direction (measured in water at 80° C. after a period of action of 10 minutes) is completely covered with a 50 $\mu$m thick layer of pressure-sensitive adhesive based on polyacrylate (Scotchtape Y 2537 from Messrs. 3M) which can be transferred in the dry state from a siliconized release paper. A strip of film 15 mm wide is cut off parallel to the lengthwise direction. The strip of film is placed with the pressure-sensitive adhesive layer on the seam formed by pushing the edges together, the two edge zones being covered symmetrically. By applying pressure, for example, with a roller, the edges pushed against one another are bonded to the strip of film, and a water-tight seam is formed. Three variants are produced: a strip of film outside or inside and a strip of film both inside and outside.

The tubes are pushed, in shirred form, onto the stuffing horn of a customary stuffing aparatus, and they are stuffed with sausage meat (recipe for a boiling sausage) and portioned into small sausages with a diameter of 20 mm and lengths of about 18 cm by twisting off and tying or clipping.

After drying at 50° to 60° C. for about 15 minutes, the small sausages are scalded in hot water at 75° to 80° C. for 10 minutes. During scalding, all the sausages assume a uniformly curved shape, which is also retained after the casings are peeled off.

EXAMPLE 2

Four tubular casings with an adhesive tape on the inside are manufactured by the process described in Example 1, the width of the strips of film being varied.

After scalding, curved small sausages are obtained which have different curvatures, depending on the width of the strip of film:

| Width of the adhesive tape | (mm) | 6 | 8 | 12 | 18 |
|---|---|---|---|---|---|
| Radius of curvature | (mm) | 250 | 230 | 200 | 150 |

EXAMPLE 3

A web of regenerated cellulose is manufactured by the viscose process and a thermosetting resin is applied directly to the not yet dried web of cellulose hydrate gel. For this application, the web of cellulose hydrate gel runs at a rate of 60 m/minute through a bath filled with a 0.15% strength by weight aqueous solution of the thermosetting resin used in Example 1 and then through a bath of approximately 6% strength by weight aqueous glycerol solution. The web of regenerated cellulose obtained after drying has a weight per unit area of 58 g/m$^2$, a water content of 8% and a glycerol content of 10% and contains about 45 mg/m$^2$ of the resin, which has hardened during drying. The web is cut into tapes 63 mm wide.

To manufacture the strip of film which is capable of shrinking, a transversely-stretched, plasticizer-free film of polyvinyl chloride which has a thickness of 40 μm and the following shrinkage values is used:

| Test conditions | Shrinkage values % | |
|---|---|---|
|  | longitudinal | transverse |
| 10 minutes in water at 80° C. | 13 | 74 |
| 15 minutes in air at 100° C. | 5 | 45 |

This film is coated, using a doctor, with a high-strength, aqueous, plasticizer-free, anionic dispersion of a pressure-sensitive adhesive based on an acrylate copolymer containing carboxyl groups, which dispersion has a solids content (DIN 53,189) of about 70%, a viscosity at 25° C. (Contraves Rheometer STV, C III) of 800 to 2,500 mPa.s and a pH value (DIN 53,785) of 3.5 to 4.5 (Acronal DS 3163 from Messrs. BASF), in a manner such that, after drying, the layer thickness which remains is about 40 μm.

In a modification of this process, the pressure-sensitive adhesive dispersion contains a pressure-sensitive adhesive based on an acrylate copolymer containing carboxyl groups and obtained also using acrylonitrile (Acronal 85 D from Messrs. BASF). The aqueous dispersion of the pressure-sensitive adhesive has a viscosity at 25° C. of 70 to 150 mPa.s (Contraves Rheometer STV, B III) and a pH value (DIN 53,785) of 2 to 3.

In a further variant, the pressure-sensitive adhesive is an aqueous, plasticizer-free, anionic dispersion of a polymer based on a butyl acrylate (Acronal 4 D from Messrs. BASF). The solids content (DIN 53,189) is about 50% and the viscosity of the dispersion at 25° C. (Epprecht viscosimeter, STV, A III) is about 15 to 18 mPa.s.

Parallel strips of film are cut at right angles to the longitudinal direction of the web coated with pressure-sensitive adhesive and are used as adhesive tapes for gluing on the inside edges of the web of regenerated cellulose which are pushed into contact with one another. The strip of film thus has a high shrinkage value in its longitudinal direction.

After filling with sausage meat and scalding according to Example 1, curved small sausages which have the following curvatures, depending on the width of the strip of film, are obtained:

| Width of adhesive tape | (mm) | 6 | 8 | 12 | 18 |
|---|---|---|---|---|---|
| Radius of curvature | (mm) | 220 | 190 | 150 | 90 |

EXAMPLE 4

Example 3 is repeated except that a strip of film is used of which the carrier material is a biaxially stretch-oriented film of polyethylene terephthalate which has a thickness of 19 μm and a heat-induced shrinkage of 20 to 25% in the longitudinal direction and 4 to 6% in the transverse direction, measured after being kept in water at 80° C. for 15 minutes.

An aqueous pressure-sensitive adhesive dispersion which, after drying, gives an adhesive thickness of about 40 μm is used for coating this film. The pressure-sensitive adhesive dispersion is an aqueous, fine-particled, plasticizer-free, anionic dispersion of a copolymer which can be cross-linked in the cold when alkali is added and contains carboxyl groups, based on acrylates with the co-use of acrylonitrile. The dispersion has a solids content (DIN 53,189) of about 50%, a viscosity at 25° C. (Contraves Rheometer, STV, B III) of 100–220 mPa.s and a pH value of 4.5 to 5.5 (Acronal 80D from Messrs. BASF). The pressure-sensitive adhesive mentioned is post-crosslinked with aqueous alkali solution after application to the web. In a modification, the pressure-sensitive adhesive is a pre-crosslinked approximately 30% strength plasticizer-free solution, which crosslinks rapidly under the action of heat. The polymer is an acrylate copolymer containing carboxyl groups contained in a petroleum hydrocarbon, having a boiling range of about 65° to 95° C. (Acronal DS 3110 from Messrs. BASF). The viscosity of the solution at 25° C. is 0.8 to 2.5 mPa.s (Epprecht viscosimeter, STV, C III).

The 12 mm wide strips of film are cut parallel to the longitudinal direction and are provided with pressure-sensitive adhesive. They are used as in Example 3 for the manufacture of tubular casings glued on the inside, and these casings are filled with sausage meat and processed in a manner described in Example 3.

Curved small sausages with radii of curvature in the range from about 200 to 220 mm are obtained.

EXAMPLE 5

A web of regenerated cellulose is manufactured by the viscose process, the thermosetting resin being applied directly to the not yet dried web of cellulose hydrate gel. For this application, the web of cellulose hydrate gel runs at a rate of 60 m/minute through a bath filled with a 0.15% strength by weight aqueous solution of the thermosetting resin used in Example 1 and then through a bath of approximately 6% strength by weight aqueous glycerol solution. The web of regenerated cellulose obtained after drying has a weight per unit area of 58 g/m$^2$, a water content of 8% and a glycerol content of 10% and contains about 45 mg/m$^2$ of the resin which has hardened during drying. The web is cut into tapes 63 mm wide.

Such a tape is shaped into a tube such that the web edges along the lengthwise axis touch. A perforated adhesive strip which has been manufactured as follows is used to bond the edges which have been pushed together:

A web of biaxially stretched polyethylene terephthalate film which is capable of shrinking under the action of heat and has a thickness of 19 $\mu$m and a heat-induced shrinkage of about 25% (measured after 15 minutes in hot water at 80° C.) in the longitudinal direction is coated with an aqueous pressure-sensitive adhesive dispersion (Acronal DS 3163, solids content: 70%, compare Example 3). The water is driven off in a stream of air at 40° C., and a silicone paper (weight per unit area: 70 g/m$^2$) with an adhesive action is placed on the approximately 40 $\mu$m thick layer of adhesive with the aid of a pair of rolls. By means of spiked rolls, this laminate is continuously provided with fine perforations which pass completely through (diameter: about 0.2 mm, number: 15/cm) and is cut into strips of any desired width.

A 12 mm wide strip is continuously freed from the silicone paper, and the adhesive side thereof is simultaneously pressed symmetrically onto the edges which have been pushed together. This glued tube with the butt seam lying on the outside is shirred, filled with sausage meat of the Viennese recipe in a stuffing apparatus and portioned into small sausages with a diameter of 20 mm and lengths of about 180 mm by twisting off or the like.

After drying at 50° to 60° C. for 15 minutes, the small sausages are smoked with moist smoke at 70° to 80° C. for 10 minutes and then scalded in hot water at 75° to 80° C. for a further 10 minutes. During smoking and scalding, the small sausages assume a curved shape which is also retained after the casings are peeled off.

EXAMPLE 6

As a modification of Example 5, the pressure-sensitive adhesive dispersion mentioned in that example is printed in the form of two parallel strips each 6 mm wide close beside the two edges of the edge zones which run along the longitudinal axis of the 63 mm wide web material of regenerated cellulose by means of screen printing using a 40 mesh stencil and a coating doctor. After the water is driven off, the adhesive is present in the form of areas of circular cross-section with a diameter of about 0.45 mm and a height of 20 to 30 $\mu$m.

The web is shaped into a tube such that the edges touch one another with their cut faces, and the adhesive is applied in the form of a strip on the inside of the tube. At the same time, a 12 mm wide, 19 $\mu$m thick strip of polyethylene terephthalate film, which is capable of shrinking under the action of heat and has been perforated by spikes according to Example 5 in a separate step, is inserted into the inner hollow space of the tube formed and is brought into contact with the two layers of adhesive.

The glued tube is filled with sausage meat, portioned, smoked and scalded, in the customary manner. The small sausages with a diameter of 20 mm which are formed have a uniform smoked coloration and a curved shape, which is also retained after the casing is peeled off.

If the tubes obtained in the examples are filled with water, they remain completely sealed in the region of the glued seam after storage in air at room temperature for several days and after being hung in hot water at 80° C. for several hours. They also withstand an internal pressure of 1 bar, which is produced, for example, with compressed air.

Referring now to the drawings, in FIG. 1 the regions of the piece or web 4 which are close to the edges 1 and 2 running along the longitudinal axis are glued together in overlapping fashion. The layers 3 containing the pressure-sensitive adhesive and the strip of film 6 which is capable of shrinking under the action of heat are positioned between the overlapping regions. The adhesion-promoting layers of resin on the surfaces of the piece or web are labeled 5a and 5b.

Figure 2:
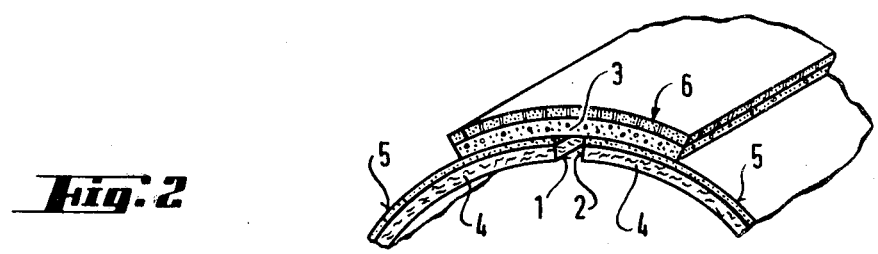
Figure 3:
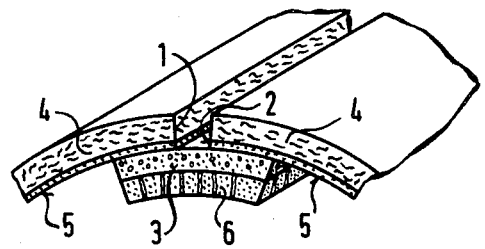

In FIGS. 2 and 3, the edges 1 and 2 of the piece or web 4 are pushed together and are bonded, via a layer 3 containing pressure-sensitive adhesive and an adhesion-promoting layer of resin 5, with a strip of film 6 which covers the two edges and is capable of shrinking under the action of heat. The strip of film 6 can thus be on either the inside or outside or on both the outside and inside of the tubular casing.

FIG. 4 shows the gluing region of a tubular casing which is to be glued analogously to FIG. 2, whereby the reference figures also have the same meaning. Passages in the adhesive layer 3 which pass through the adhesive applied in a punctiform structure are labeled 7.

FIG. 5 shows a further embodiment of the gluing region shown in FIG. 4. Perforations 8 in the region of the edges 1 and 2 and of the strip of film 6 extend through the entire seam, including the web 4, the adhesion-promoting layer of resin 5, the adhesive layer 3 and the strip of film 6.

For reasons of better clarity, the dimensions of the layers shown in the figures are not shown according to scale.

Figure 6:
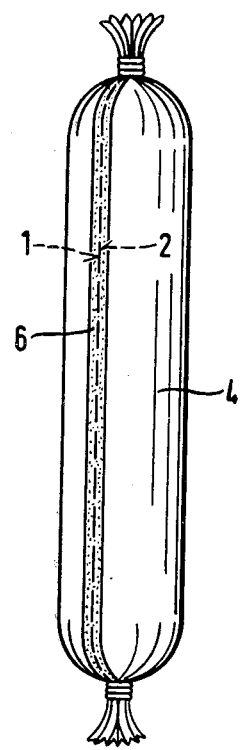
FIGS. 6 and 7 are plan views of a sausage with the tubular casing of the invention before and after scalding or smoking, respectively.
Figure 7:
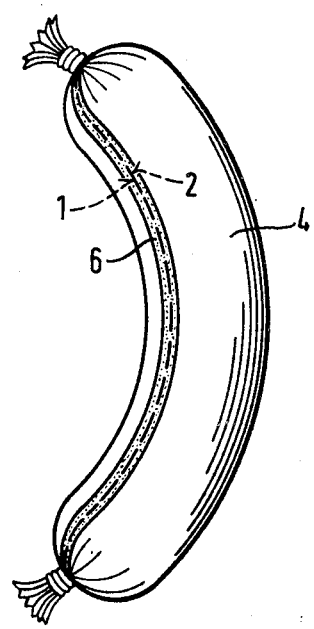

FIGS. 6 and 7 show tubular casings filled with sausage emulsion, before and after shrinking of the strip of film 6 under the action of heat, respectively.

Figure 8:
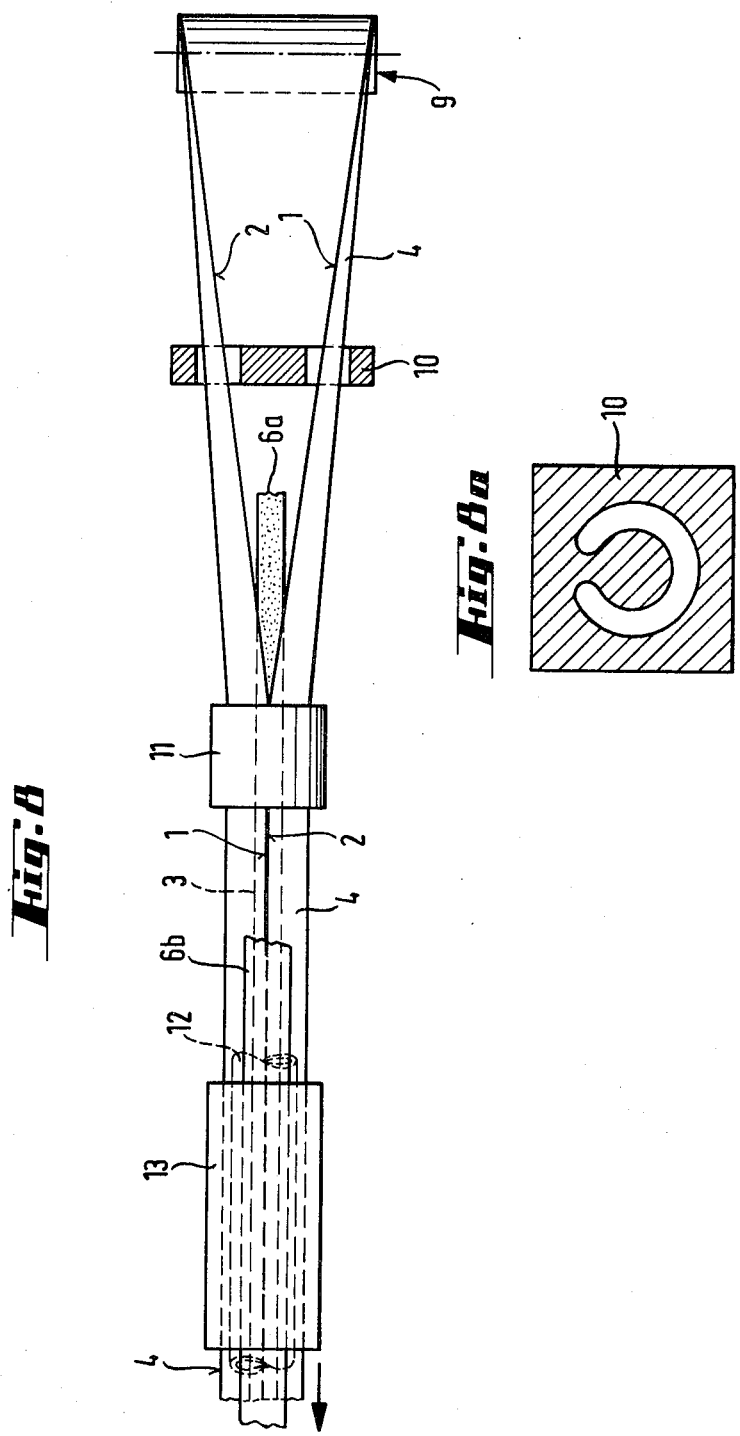

The course of the process for shaping the tube and gluing the edge region to give the gluing region shown in FIG. 2 can be seen from FIG. 8. The web 4, which is drawn off from a reel 9, passes through a shaping template 10, shown in section in FIG. 8a, and an overlapping aid 11, in which the edges of the web 4 are pushed close to one another. Before the overlapping aid 11, a strip of film 6a is glued with its adhesive layer to the inside of the now tubular web 4, and after the overlapping aid 11, a further strip of film 6b is glued onto the outside of the tubular web 4. The web 4 then passes through the schematically shown supporting pipe 12 with the surrounding sleeve 13.

Figure 9:
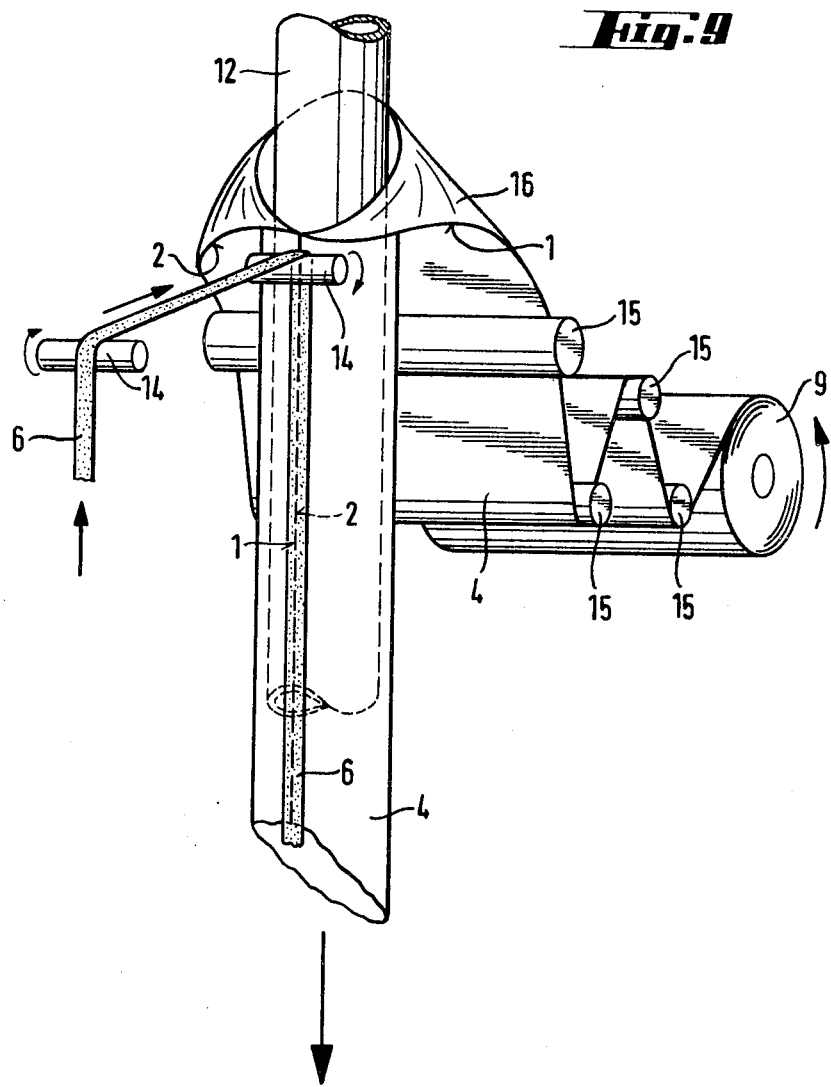
FIG. 9 schematically illustrates another process for manufacturing tubular casings according to the invention.

In FIG. 9, the tube is formed by means of a shaping shoulder. A strip of film 6 which is capable of shrinking under the action of heat is glued onto the edge region of the web 4 by a process analogous to that shown in FIG. 8, with this strip being passed over rolls 14, as shown. The web 4 runs over rolls 15 to a shaping shoulder 16, where it is shaped into a tube.

What is claimed is:

1. A tubular casing suitable for containing foodstuffs, comprising:
   a web of material comprising a naturally occurring polymer, said web being curved about its longitudinal axis in such a manner that its two longitudinal edge regions are positioned to form a seam;
   a layer of a substantially water-insoluble adhesion-promoting resin covering at least one of the inside and outside surfaces of said web in at least the area of said two edge regions;
   a strip of film applied to said longitudinal edge regions forming the seam, said strip of film comprising a material capable of shrinking predominantly in the direction of its longitudinal axis upon the application of heat; and
   a layer of a pressure-sensitive adhesive interposed between said strip of film and each edge region of said web material, whereby the seam is sealed by said strip of film via said layer of pressure-sensitive adhesive and said layer of adhesion-promoting resin.

2. A tubular casing as claimed in claim 1, wherein said strip of film shrinks between about 5 and 80% in the longitudinal direction in the temperature range from about 60° to 100° C.

3. A tubular casing as claimed in claim 1, wherein said web of material comprises regenerated cellulose.

4. A tubular casing as claimed in claim 1, wherein said substantially water-insoluble adhesion-promoting resin comprises a polymer containing vinylidene groups.

5. A tubular casing as claimed in claim 1, wherein said strip of film, and said edge zones are permeable to smoke, and wherein said layer of pressure-sensitive adhesive includes openings to improve the permeability to smoke.

6. A tubular casing as claimed in claim 5, wherein at least one of said strip of film and said layer of pressure-sensitive adhesive comprises a sheet-like textile structure, a sponge, a foam, a microporous film or a microporous membrane.

7. A tubular casing as claimed in claim 1, wherein said adhesion-promoting resin comprises a hardened cationic thermosetting resin selected from a urea/formaldehyde, melamine/formaldehyde or phenol/formaldehyde resin or a condensation product of a polyamide-polyamine, an aliphatic polyamine or a polyamide with a bifunctional halohydrin or a derivative thereof.

8. A tubular casing as claimed in claim 1, wherein said bifunctional halohydrin comprises epichlorohydrin.

9. A tubular casing as claimed in claim 1, wherein said pressure-sensitive adhesive comprises a polyacrylate or a polymethacrylate.

10. A tubular casing as claimed in claim 9, wherein said pressure-sensitive adhesive comprises a resin which can be crosslinked by means of heat and/or chemically.

11. A tubular casing as claimed in claim 10, wherein said pressure-sensitive adhesive contains a copolymer with reactive comonomers.

12. A tubular casing as claimed in claim 11, wherein said pressure-sensitive adhesive contains a resin based on an acrylate copolymer containing carboxyl groups.

13. A tubular casing as claimed in claim 9, wherein said pressure-sensitive adhesive contains a resin based on a copolymer with acrylate and acrylonitrile comonomers.

14. A tubular casing as claimed in claim 9, wherein said pressure-sensitive adhesive contains a homopolymer or copolymer of butyl acrylate and/or 2-ethylhexyl acrylate.

15. A tubular casing as claimed in claim 1, wherein the casing is shirred and the seam region is arranged spirally around the lengthwise axis of the shirred tubular casing in at least a part of the tubular casing.

16. A tubular casing as defined in claim 1, wherein said longitudinal edge regions lie in edge to edge relationship with one another and said strip of film overlies said contiguous edge region.

17. A tubular casing as claimed in claim 16, comprising two of said strips of film, one overlying the inside surface of said web and the other overlying the outside surface of said web.

18. A tubular casing as defined in claim 1, wherein said longitudinal edge regions overlap one another and said strip of film is interposed between said longitudinally overlapped edge regions.

* * * * *